No. 890,408. PATENTED JUNE 9, 1908.
J. F. COMEE.
PACKING.
APPLICATION FILED JUNE 13, 1907.
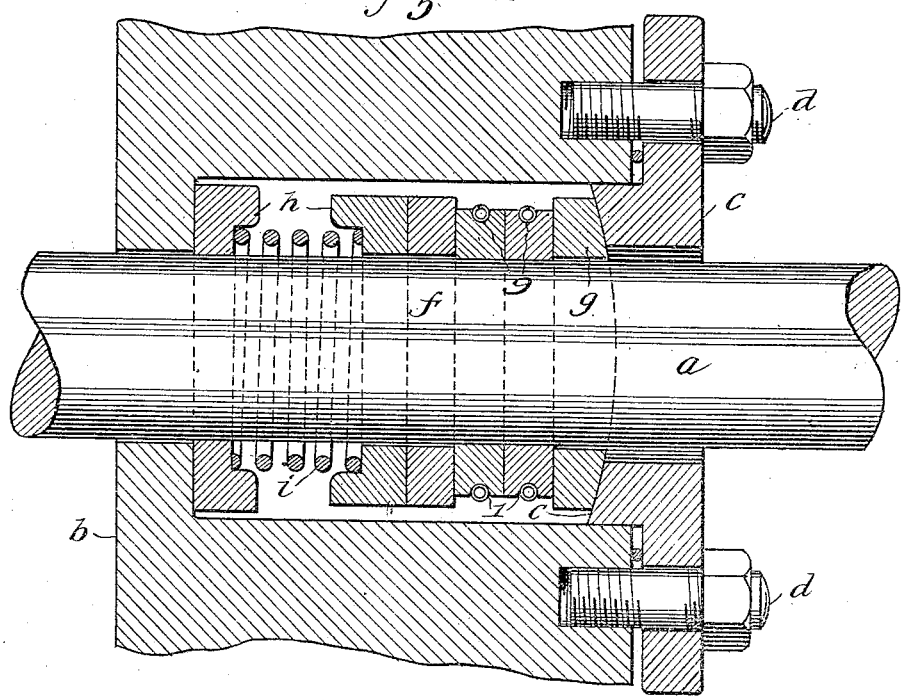
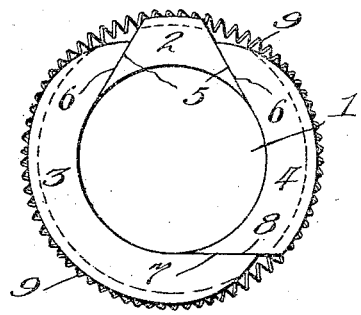
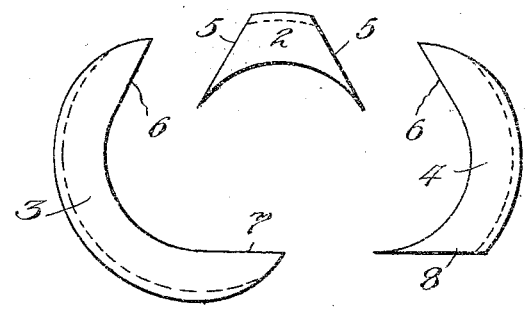
Witnesses
Frank B. Hoffman.
J. W. Garner
Inventor
Joseph F. Comee
By
Victor J. Evans
Attorney

UNITED STATES PATENT OFFICE.

JOSEPH F. COMEE, OF ROSEBURG, OREGON.

PACKING.

No. 890,408.  Specification of Letters Patent.  Patented June 9, 1908.

Application filed June 13, 1907. Serial No. 378,834.

*To all whom it may concern:*

Be it known that I, JOSEPH F. COMEE, a citizen of the United States, residing at Roseburg, in the county of Douglas and State of Oregon, have invented new and useful Improvements in Packing, of which the following is a specification.

This invention is an improved metallic packing for piston rods, valve stems, throttle stems of locomotive and other engines, pumps, air compressors and the like, and it consists of a packing ring comprising a plurality of sections having meeting faces slidably related and tangential to the circle formed by the inner side of such packing ring, and yielding means connecting such sections together to enable them to move radially to allow such packing ring to conform to irregularities in the rod or other element on which the same is employed, the said invention further consisting in the construction, combination and arrangement of devices hereinafter described and claimed.

In the accompanying drawings, Figure 1 is a sectional view of a stuffing box and a packing therein embodying my invention, a portion of a piston rod extending through such stuffing box and packing being indicated in side elevation. Fig. 2 is a detail side elevation of one of the packing rings. Fig. 3 is a similar view showing the sections thereof, separated. Fig. 4 is an elevation of the spring which is employed to yieldingly connect such sections of the packing ring together.

In accordance with my invention, I provide a packing ring 1 which comprises a plurality of sections having meeting faces slidably related and tangential to the circle formed by the inner side of such packing ring. Such packing ring comprises a segmental key section 2 and a pair of curved sections 3—4 of unequal length, the section 3 being the longer. The key section is substantially wedge shaped, its side faces 5 converging outwardly and being tangential to the circle formed by the inner side of the packing ring when its sections are assembled, as shown in Fig. 2. The sections 3—4 are each provided at one end with an inner face 6, such faces being also tangential to such circle and parallel with the outwardly converging ends of the key section. Such section 3 has its opposite end provided with an inner face 7 which is also tangential to such circle and is disposed at right angles to a line intersecting the axis of such circle and passing through the key section at a point midway between the ends of such key section. The shorter section 4 has its outer end 8 parallel with such inner face 7 and slidably related thereto, so that such end of the section 4 is overlapped by the abutting end of the section 3. The key section is disposed between the inner inclined faces 6 of the sections 3—4.

It will be understood that the sections of the packing ring may be assembled around a piston or pump rod, or moving element, such as indicated at *a*, in Fig. 1. Such sections are provided in their outer sides with grooves which receive a spring 9 that is employed to yieldably connect such sections together. Such spring is here shown as a coiled extensile spring, passed around the periphery of the said packing ring and having its ends detachably connected together, one of such ends being formed with a hook 10 and the other with an eye 11 to receive such hook. It will be understood that the said spring serves to compress the several sections of the packing ring on the piston rod or other moving element so as to cause such packing ring to closely embrace such rod. In the event that such rod is uneven, the said sections of the packing ring will move radially and slidably with reference to one another to compensate for such unevenness of such rod and will, under all conditions and at all times, closely embrace the same and effect a tight packing around the same.

My improved packing ring is, in practice, formed preferably of some hard metal, cast iron being a suitable material for this purpose, but I do not limit myself in this particular. Owing to the extreme flexibility of the packing ring, imparted thereto by the construction and slidable relation of its sections and by the spring which forms a yieldable spring connection between such sections, the sections of the ring do not have to flex to accommodate themselves to any unevenness in the rod, and therefore, I am enabled to make the sections of the packing ring of harder and more durable material than has heretofore been employed in packings of this character. Furthermore, since the sections of my packing ring may be made of comparatively cheap material, such as cast iron, my improved packing ring may be produced at minimum cost.

In Fig. 1, I show a plurality of my improved packing rings 1 employed on a piston rod *a* and in the chamber of a packing box *b*. The cap *c* of such packing box is secured in place by bolts *d* and is provided with a concave seat *e* on its inner side. Joint rings *f—g* are placed on the outer sides of the packing rings 1. The outer face of the joint rings *g* is convex and engages the seat *e* of the top *c*. In the inner end of the chamber of the packing box are a pair of washers *h* one of which bears against the joint ring *f*. A spring *i* which encircles the rod *a* bears between such washer and serves to keep the joint rings and the packing rings firmly compressed and in contact with one another. My improved packing ring may be used in connection with other packing devices and I do not desire to limit myself in this particular.

Having thus described the invention, what I claim as new and desire to secure by Letters Patent is:

1. A packing ring comprising a key section having outwardly converging ends, and a pair of opposing curved sections of unequal length, said curved sections each having at one end an inclined inner face respectively parallel with the outwardly converging ends of the key section, the longer curved section having an arm forming the portion of the ring opposite said key section, the end of said arm and the adjacent end of the shorter curved section being formed for a lapping sliding engagement.

2. A packing ring comprising a key section having outwardly converging ends, and a pair of curved sections of unequal length, each provided at one end with an inclined inner face parallel with one of such ends of the key sections, the longer section having an inner face at the opposite end disposed at an angle to its inclined inner face, and the shorter section having an outer face slidably related to the last-mentioned inner face of the longer section and overlapped thereby.

3. A packing ring comprising a pair of curved arms of unequal length, one abutting against the other at one end and disposed in overlapping slidable relation thereto, such curved arms having outwardly converging inner faces at their opposite ends, and a key section disposed between such faces and having ends slidably engaged by and parallel with such faces.

4. A packing ring comprising a key section having oppositely inclined faces at one end converging outwardly toward a line intersecting the axis of the circle formed by the inner side of such packing ring, and a pair of curved sections of unequal length, each having at one end an inclined inner face parallel with and to bear against one of such faces of the key section, the longer curved section having an inner face at its opposite end disposed at right angles to such line and the shorter curved sections having one end abutting against, overlapped by and parallel with such end of the longer curved section.

In testimony whereof, I affix my signature in presence of two witnesses.

JOSEPH F. COMEE.

Witnesses:
R. C. HUTCHINSON,
D. S. WEST.